United States Patent
Okumura et al.

(10) Patent No.: US 7,531,231 B2
(45) Date of Patent: May 12, 2009

(54) HONEYCOMB STRUCTURE

(75) Inventors: Jun Okumura, Nisshin (JP); Tomohiro Iida, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/432,500

(22) Filed: May 12, 2006

(65) Prior Publication Data

US 2006/0263573 A1    Nov. 23, 2006

(30) Foreign Application Priority Data

May 23, 2005   (JP)   ............... 2005-149115

(51) Int. Cl.
*B32B 3/12*   (2006.01)
*B01D 39/06*   (2006.01)

(52) U.S. Cl. .................. 428/116; 428/117; 55/523

(58) Field of Classification Search ................ 428/116; 55/523
See application file for complete search history.

(56) References Cited

U.S. PATENT DOCUMENTS

| | | | |
|---|---|---|---|
| 4,304,585 A | | 12/1981 | Oda et al. |
| 4,335,783 A | | 6/1982 | McBrayer et al. |
| 6,669,751 B1 | * | 12/2003 | Ohno et al. ............... 55/523 |
| 6,797,666 B2 | * | 9/2004 | Harada et al. ............ 502/180 |
| 7,037,567 B2 | * | 5/2006 | Hashimoto et al. ........ 428/116 |
| 7,294,316 B2 | * | 11/2007 | Harada et al. ............ 422/180 |
| 7,316,722 B2 | * | 1/2008 | Komori et al. ............. 55/523 |
| 2003/0053940 A1 | | 3/2003 | Harada et al. |
| 2003/0138596 A1 | | 7/2003 | Harada et al. |
| 2005/0178098 A1 | | 8/2005 | Ono et al. |

FOREIGN PATENT DOCUMENTS

| | | |
|---|---|---|
| EP | 0 501 733 A1 | 9/1992 |
| EP | 1 142 619 A1 | 10/2001 |
| EP | 1 291 061 A1 | 3/2003 |
| JP | A 11-114339 | 4/1999 |
| JP | A 2002-219317 | 8/2002 |
| WO | WO 2005/047210 A1 | 5/2005 |

\* cited by examiner

*Primary Examiner*—Timothy M Speer
*Assistant Examiner*—Gordon R Baldwin
(74) *Attorney, Agent, or Firm*—Oliff & Berridge, PLC

(57) ABSTRACT

There is disclosed a honeycomb structure which is useful as a trapping filter for an exhaust gas, above all a diesel particulate filter (DPF) for trapping particulate matters (particulates) in an exhaust gas from a diesel engine and in which internal and external temperature rises are uniformed during use and during regeneration and in which there are effectively prevented generation of defects such as cracks due to a thermal stress and generation of an adverse influence on a carried catalyst. A honeycomb structure 1 includes: a bonded honeycomb segment article 10 in which bond surfaces of a plurality of honeycomb segments 2 are integrally bonded to one another via bonding material layers 9; and an outer peripheral coating layer 4 which coats an outer peripheral surface of the bonded honeycomb segment article 10. The honeycomb structure has a structure in which a plurality of cells 5 forming fluid channels are arranged in parallel with one another in a central axis direction. The honeycomb segments 2 are bonded via the bonding material layers (partial bonding material layers) 9 disposed only in predetermined portions of the honeycomb segments 2.

4 Claims, 4 Drawing Sheets

HONEYCOMB STRUCTURE

BACKGROUND OF THE INVENTION

1. Field of the Invention

The present invention relates to a honeycomb structure in which a plurality of honeycomb segments are integrally bonded to one another by bonding material layers, more particularly to a honeycomb structure which is useful as a filter for trapping an exhaust gas, above all a diesel particulate filter (DPF) for trapping particulate matters (particulates) and the like in an exhaust gas from a diesel engine and in which generation of defects such as cracks due to a thermal stress during use and during regeneration is effectively prevented.

2. Description of the Related Art

A honeycomb structure is incorporated into an exhaust system or the like of a diesel engine, and used as a filter for trapping an exhaust gas, for example, a diesel particulate filter (DPF) in order to trap and remove particulate matters (particulates) included in an exhaust gas from a diesel engine or the like. Such honeycomb structure has a disadvantage that temperature easily non-uniformly rises in the whole honeycomb structure, and defects such as cracks are generated by a thermal stress during use (when the particulates are trapped and removed) and during regeneration (when the particulates deposited in the filter are burnt and removed in order to remove an increase of a pressure loss due to the particulates deposited in the filter with an elapse of time). From a viewpoint of solving such disadvantage, there is proposed a honeycomb structure in which bond surfaces of a plurality of honeycomb segments are integrally bonded to one another via bonding material layers to constitute a bonded honeycomb segment article, and accordingly the thermal stress is reduced.

However, a honeycomb structure made of silicon carbide (SiC), which is expected to be used owing to an advantage that its thermal resistance is excellent, has disadvantages that a thermal expansion coefficient is larger than that of a honeycomb structure made of cordierite and that a resistance to thermal shock is inadequate. Therefore, it is disadvantageously difficult to sufficiently use the advantage. In recent years, with enlargement of the filter, the thermal stresses generated during the use and during the regeneration have increased more remarkably than before. Consequently, a frequency and a degree of generation of the defect due to the thermal stress rapidly raise a serious problem. To solve such disadvantage, there is disclosed a method of manufacturing a ceramic structure (honeycomb structure), including a step of assembling ceramic blocks by repeating steps of: forming an adhesive paste layer (bonding material layer) on a side face of a porous ceramic member (honeycomb segment) so that an area of the layer occupies 60% or more of a total area of this side face; and thereafter laminating another porous ceramic member on the layer (see Patent Document 1). However, the ceramic structure (honeycomb structure) disclosed in Patent Document 1 has a problem that the generation of the defect due to the thermal stress cannot be necessarily sufficiently prevented for a reason that a temperature gradient in the filter is easily increased. This is because a rigid bonded structure has an opposite effect of increasing the thermal stress generated from the temperature gradient, and the bonding member has a large thermal capacity and a low temperature drop/rise rate as compared with a porous ceramic member.

[Patent Document 1] Japanese Patent Application Laid-Open No. 2002-219317

SUMMARY OF THE INVENTION

The present invention has been developed in view of the above-described problem, and an object is to provide a honeycomb structure which is useful as a filter for trapping an exhaust gas, above all a diesel particulate filter (DPF) for trapping particulate matters (particulates) and the like in an exhaust gas from a diesel engine and in which generation of defects such as cracks due to a thermal stress is effectively prevented during use and during regeneration.

To achieve the above-described object, the present invention provides the following honeycomb structure.

[1] A honeycomb structure comprising: a bonded honeycomb segment article in which bond surfaces of a plurality of honeycomb segments are integrally bonded to one another via bonding material layers; and an outer peripheral coating layer which coats an outer peripheral surface of the bonded honeycomb segment article, the honeycomb structure having a structure in which a plurality of cells forming fluid channels are arranged in parallel with one another in a central axis direction, wherein the honeycomb segments are bonded via the bonding material layers (partial bonding material layers) disposed only in predetermined portions of the honeycomb segments.

[2] The honeycomb structure according to the above [1], wherein the predetermined portion of the honeycomb segment provided with the partial bonding material layer is a portion which is disposed between the center and an outer portion of the honeycomb segment and in which any maximum thermal stress is not generated.

[3] The honeycomb structure according to the above [1] or [2], wherein the predetermined portion of the honeycomb segment provided with the partial bonding material layer is a portion including opposite end portions of the honeycomb segment in the central axis direction.

[4] The honeycomb structure according to any one of the above [1] to [3], wherein the partial bonding material layer is made of an inorganic fiber, an inorganic binder, an organic binder, and inorganic particles.

[5] The honeycomb structure according to any one of the above [1] to [4], wherein the honeycomb segment is made of silicon carbide (SiC) or a silicon-silicon carbide composite material formed by use of silicon carbide (SiC) as an aggregate and silicon (Si) as a bonding material.

As described above, according to the present invention, there is provided a honeycomb structure which is useful as a trapping filter for an exhaust gas, above all a diesel particulate filter (DPF) for trapping particulate matters (particulates) in an exhaust gas from a diesel engine and in which generation of defects such as cracks due to thermal stresses during use and during regeneration is effectively prevented.

DESCRIPTION OF THE PREFERRED EMBODIMENT

Figure 3:
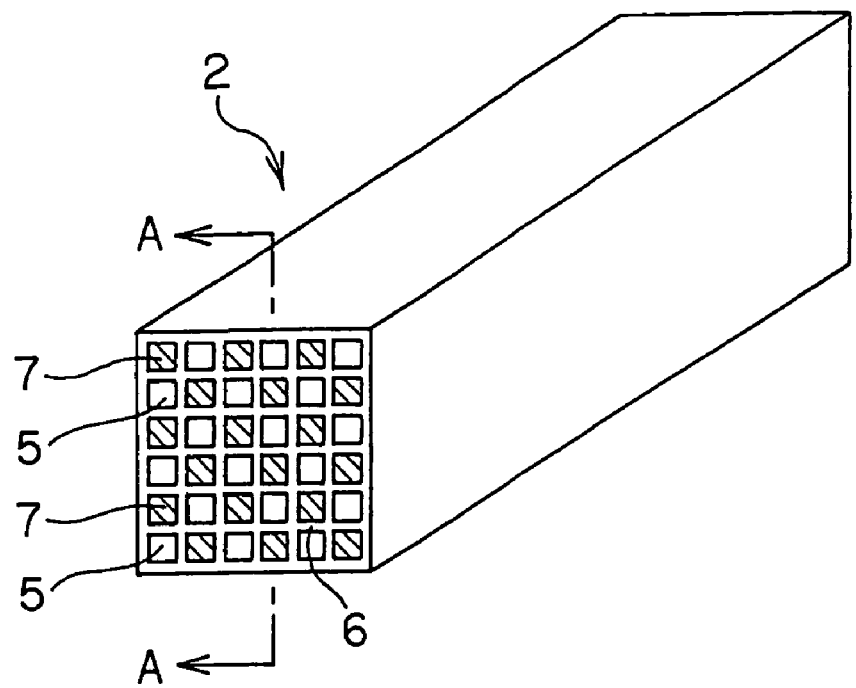
FIG. 3 is a perspective view schematically showing a honeycomb segment for use in another embodiment of the honeycomb structure of the present invention.
Figure 4:
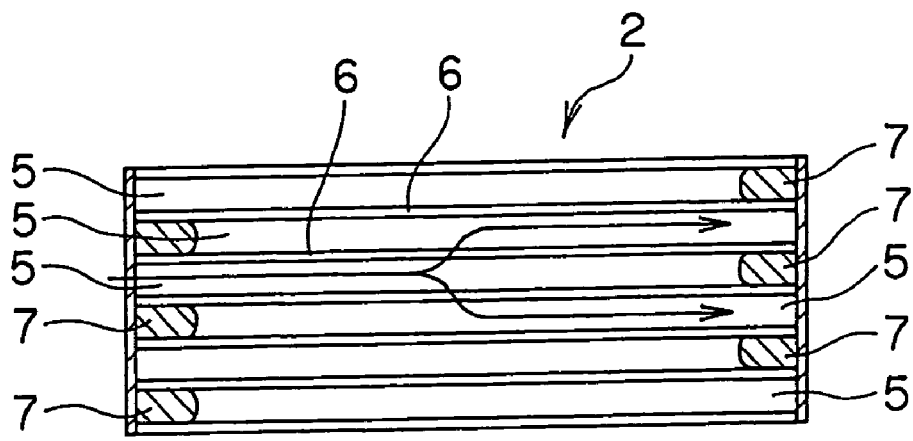
FIG. 4 is a sectional view cut along the A-A line of FIG. 3.
Figure 5:
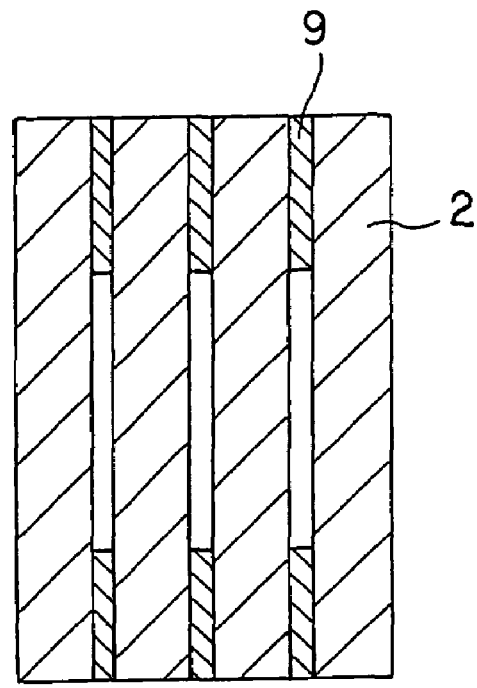
FIG. 5 is a sectional view schematically showing an example in which a bonding material layer (partial bonding material layer) is disposed in a honeycomb segment in Example 1.
Figure 6:
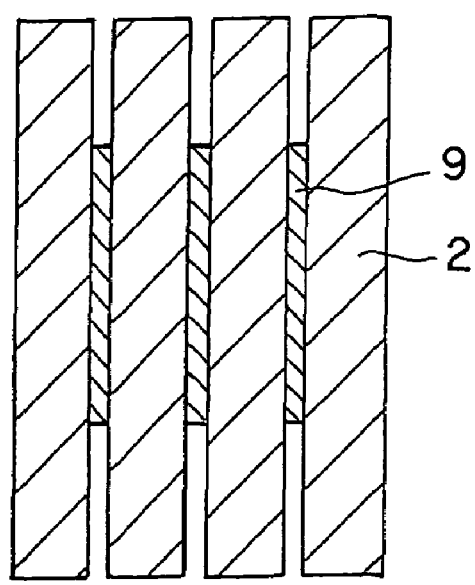
FIG. 6 is a sectional view schematically showing another example in which a bonding material layer (partial bonding material layer) is disposed in a honeycomb segment in Example 2.

As shown in FIGS. 1 to 4, in an embodiment of the present invention, a honeycomb structure 1 includes: a bonded honeycomb segment article 10 in which bond surfaces of a plurality of honeycomb segments 2 are integrally bonded to one another via bonding material layers 9; and an outer peripheral coating layer 4 which coats an outer peripheral surface of the bonded honeycomb segment article 10. The honeycomb structure 1 has a structure in which a plurality of cells 5 forming fluid channels are arranged in parallel with one another in a central axis direction. A sectional shape of at least one honeycomb segment 2 in a direction perpendicular to the central axis direction has two or more curvature radii (R). Here, FIGS. 5 to 7 show examples in which the bonding material layers (partial bonding material layers) 9 are disposed in predetermined portions of the honeycomb segments 2.

There will be described a structure of the honeycomb structure 1 in the embodiment of the present invention in more detail. In the embodiment of the present invention, the honeycomb structure 1 has a structure in which a plurality of cells 5 defined by porous partition walls 6 and forming fluid channels are arranged in parallel with one another in a central axis direction of the honeycomb structure 1. The structure includes: the bonded honeycomb segment article 10 in which a plurality of honeycomb segments 2 are integrally bonded by the bonding material layers (partial bonding material layers) 9; and the outer peripheral coating layer 4 which coats the outer peripheral surface of the bonded honeycomb segment article 10. Each of the honeycomb segments has a shape constituting a part of the whole structure, and the honeycomb segments have shapes constituting the whole structure, when they are assembled in a direction perpendicular to a central axis of the honeycomb structure 1. After bonding the honeycomb segments 2 by the bonding material layers (partial bonding material layers) 9, the honeycomb segments are ground so that the whole shape of a section obtained by cutting the segments along a plane perpendicular to the central axis of the honeycomb structure 1 is a circular shape, an elliptic shape, a racing track shape, or a partially deformed shape, and the outer peripheral surface of the structure is coated with the outer peripheral coating layer 4. In a case where this honeycomb structure 1 is used as a DPF, when the structure is disposed in an exhaust system or the like of a diesel engine, particulate matters (particulates) including soot discharged from the diesel engine can be trapped. It is to be noted that in FIG. 1, the cell 5 and the partition wall 6 are shown in only one honeycomb segment 2. As shown in FIGS. 3 and 4, each of the honeycomb segments 2 has a shape constituting a part of the whole structure of the honeycomb structure 1 (bonded honeycomb segment article 10) (see FIG. 1). Moreover, the honeycomb segments have shapes constituting the whole structure, when they are assembled in the direction perpendicular to the central axis of the honeycomb structure 1 (see FIG. 1). The cells 5 are arranged in parallel with one another in the central axis direction of the honeycomb structure 1, and end portions of adjacent cells 5 are alternately closed with filling materials 7.

Figure 2:
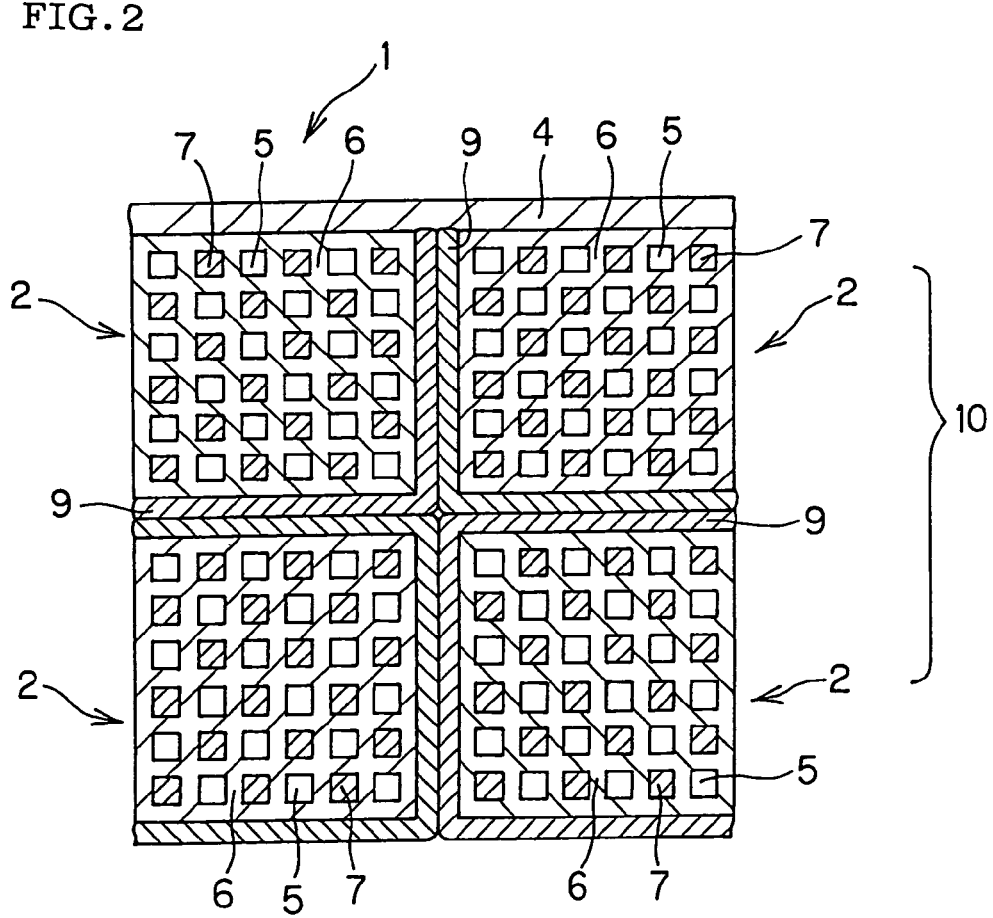
FIG. 2 is a front view of a part of a honeycomb structure as viewed from an end-face side in another embodiment (the whole section cut along a plane perpendicular to a central axis has a square shape) of the present invention.

A left end portion of the predetermined cell 5 (inflow cell) in FIG. 3 or 4 is opened whereas a right end portion is closed with the filling material 7. In another cell 5 (outflow cell) adjacent to this cell, a left end portion is closed with the filling material 7, but a right end portion is opened. By such closing, as shown in FIG. 2, an end face of the honeycomb segment 2 exhibits a checkered pattern. In a case where the honeycomb structure 1 constituted by bonding such plurality of honeycomb segments 2 is disposed in the exhaust system of an exhaust gas, the exhaust gas flows from a left side in FIG. 4 into the cell 5 of each honeycomb segment 2, and moves to a right side.

FIG. 4 shows a case where the left side of the honeycomb segment 2 is an inlet of the exhaust gas. The exhaust gas flows into the honeycomb segment 2 from the cell 5 (inflow cell) opened without being closed. The exhaust gas which has flown into the cell 5 (inflow cell) passes through the porous partition wall 6, and flows out of the other cell 5 (outflow cell). Moreover, when the exhaust gas passes through the partition wall 6, particulate matters (particulates) including the soot of the exhaust gas are trapped by the partition wall 6. The exhaust gas can be purified in this manner. Since the particulate matters (particulates) including the soot are trapped in this manner, they are deposited in the honeycomb segment 2 with an elapse of time, and a pressure loss increases. Therefore, regeneration is performed to burn the soot and the like. It is to be noted that FIGS. 2 to 4 show the honeycomb segment 2 whose sectional shape is entirely square. However, the shape may be a quadrangular shape, a partially deformed quadrangular shape, a triangular shape, a hexagonal shape or the like. The sectional shape of each cell 5 may be a polygonal shape, a circular shape, en elliptic shape, a racing track shape, or a partially deformed shape.

The honeycomb structure of the present invention has the above-described structure, but predetermined portions of the honeycomb segment 2 in which the partial bonding material layers 9 are disposed are preferably portions which are disposed between the center and outer portions of the honeycomb segment 2 and in which a maximum thermal stress cannot be generated. Specifically, as shown in FIGS. 5 to 7, such portions in which the maximum thermal stress cannot be generated are preferably in regions of lengths from opposite ends toward the center in the central axis direction, each length occupying 30% or less of the whole length (60% or less in total) or 15% or less of the whole length (30% or less in total).

Moreover, as shown in FIGS. 5-7, the predetermined portion of the honeycomb segment 2 in which the partial bonding material layer 9 is disposed preferably includes opposite end portions in the central axis direction. When the honeycomb segment is constituted in this manner, it is possible to prevent soot leakage from a honeycomb segment outer wall of a portion in which any bonding material layer is not disposed.

From viewpoints of strength and thermal resistance, as a material of the honeycomb segment 2, there is preferably used at least one type selected from the group consisting of silicon carbide, silicon-silicon carbide composite material, silicon nitride, cordierite, mullite, alumina, spinel, silicon carbide-cordierite composite material, silicon-silicon carbide composite material, lithium aluminum silicate, aluminum titanate, and Fe—Cr—Al metal. Above all, silicon carbide or silicon-silicon carbide composite material is preferable.

The honeycomb segment 2 can be prepared by: for example, adding, to the material appropriately selected from the above-described materials, a binder such as methyl cellulose, hydroxypropoxyl cellulose, hydroxyethyl cellulose, carboxymethyl cellulose, or polyvinyl alcohol, surfactant, water as a solvent or the like to obtain a plastic clay; extruding this clay into the above-described shape; subsequently drying the clay with microwave, hot air or the like; and thereafter sintering the clay.

As the filling material 7 for use in closing the cell 5, a material similar to that of the honeycomb segment 2 is usable. The closing with the filling material 7 can be performed by immersing an end face of the honeycomb segment 2 in the slurried filling material 7 in a state in which the cell 5 that is not to be closed is masked to thereby fill the opened cell 5 with the closing material 7. After molding the honeycomb segment 2, the cell may be filled with the filling material 7 before or after firing the segment, but the filling is preferably performed before the firing because a firing step is completed once.

Figure 1:
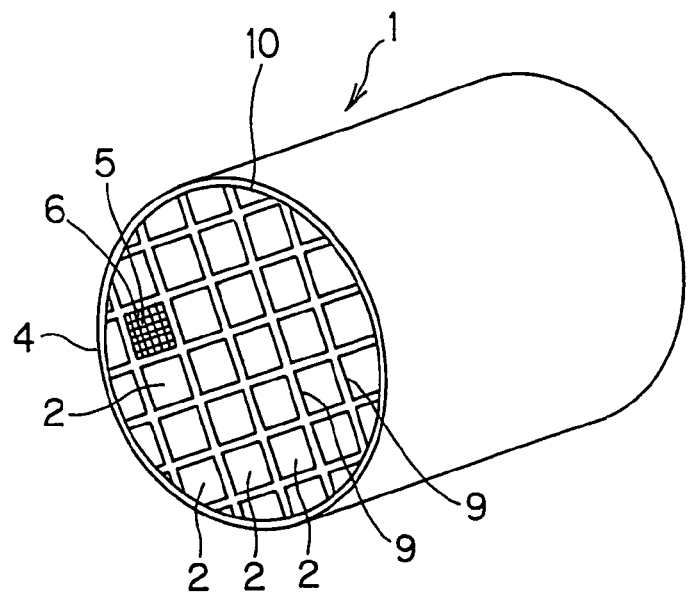
FIG. 1 is a perspective view schematically showing one embodiment (the whole section cut along a plane perpendicular to a central axis has a circular shape) of a honeycomb structure in the present invention.

After preparing each honeycomb segment 2 as described above, the outer peripheral surface of the honeycomb segment 2 is coated with the slurried bonding material layer (partial bonding material layer) 9. A plurality of honeycomb segments 2 are assembled so as to form a predetermined three-dimensional shape (the whole structure of the honeycomb structure 1), and the assembled segments are attached to one another under pressure, heated, and dried. The plurality of honeycomb segments 2 are integrally bonded to one another in this manner to prepare a bonded article. Thereafter, this bonded article is ground into the above-described shape, the outer peripheral surface of the article is coated with the coating layer 4, and the article is heated and dried. The honeycomb structure 1 shown in FIG. 1 is prepared in this manner.

Each bonding material layer (partial bonding material layer) 9 for use in the present invention functions so as to bond the honeycomb segments 2 to one another, when the layer is formed on the outer peripheral surface of each honeycomb segment 2. Examples of a method of forming the bonding material layers (partial bonding material layers) 9 includes a method in which the outer peripheral surfaces of the honeycomb segments 2 are coated with the slurried bonding material layers 9 after the honeycomb segments 2 are prepared. The honeycomb segments 2 are assembled so as to form the predetermined three-dimensional shape (the whole structure of the honeycomb structure 1). After the assembled segments are attached to one another under pressure, they are heated and dried. In this case, the outer peripheral surfaces of the adjacent honeycomb segments 2 are coated, but one of the facing outer peripheral surfaces of the adjacent honeycomb segments 2 may be coated.

In a case where only one of the surfaces facing each other is coated in this manner, an amount of the bonding material layer (partial bonding material layer) 9 to be used can be preferably saved. A thickness of the bonding material layer (partial bonding material layer) 9 is determined in consideration of a force for bonding the honeycomb segments 2 to one another, and the thickness is appropriately selected in a range of, for example, 0.2 to 4.0 mm.

Preferable examples of the bonding material layer (partial bonding material layer) 9 for use in the present invention include layers made of an inorganic fiber, an inorganic binder, an organic binder, and inorganic particles. Typical examples of the inorganic fiber include oxide fibers such as aluminosilicate and alumina, and an SiC fiber. Examples of the inorganic binder include silica sol, alumina sol, and clay. Examples of the organic binder include polyvinyl alcohol (PVA), carboxymethyl cellulose (CMC), and methyl cellulose (MC). Examples of the inorganic particles include ceramics such as silicon carbide, silicon nitride, cordierite, alumina, and mullite.

The outer peripheral coating layer 4 functions so as to protect the outer peripheral surface of the bonded article of the honeycomb segments 2, when the layer is formed on the outer peripheral surface of the bonded article of the honeycomb segments 2. A thickness of the outer peripheral coating layer 4 is appropriately selected in a range of, for example, 0.1 to 1.5 mm.

The bonding material layer (partial bonding material layer) 9 and the outer peripheral coating layer 4 preferably have a thermal conductivity of 0.1 to 5.0 W/m·k. A coefficient of thermal expansion of each of the bonding material layer (partial bonding material layer) 9 and the outer peripheral coating layer 4 is preferably comparatively small in a range of preferably $1\times10^{-6}$ to $8\times10^{-6}/°$ C. in order to prevent cracks from being generated by thermal shock or the like.

EXAMPLES

The present invention will be described hereinafter in more detail in accordance with examples, but the present invention is not limited to any of these examples.

Example 1

As a honeycomb segment material, SiC powder and metal Si powder were mixed at a mass ratio of 80:20. To this material, starch and foam resin were added as a pore former. Furthermore, methyl cellulose, hydroxypropoxyl methyl cellulose, surfactant, and water were added, and a plastic clay was prepared. This clay was extruded, and dried with microwave and hot air to obtain a honeycomb segment molded article having: a partition wall thickness of 310 μm; a cell density of about 46.5 cells/cm$^2$ (300 cells/square inch); a square section whose one side was 35 mm; and a length of 152 mm. Opposite end faces of the cells were closed so that each end face of this honeycomb segment molded article had a checkered pattern. That is, the end faces were closed so that opposite end portions of adjacent cells were alternately closed. As a closing material, a material similar to a honeycomb segment material was used. After closing the opposite end faces of the cells and drying the cells, the cells were degreased at about 400° C. in the atmosphere, and thereafter fired at about 1450° C. in an Ar inactive atmosphere, thereby obtaining a honeycomb segment having a porous structure in which SiC crystal particles were bonded by Si.

Preparation of Bonding Material

An aluminosilicate fiber as an inorganic fiber, colloidal silica and clay as inorganic binders, and inorganic particles of SiC were mixed. Furthermore, water was added to the mixture. If necessary, an organic binder (CMC, PVA), foam resin, and dispersant were added. The mixture was kneaded with a mixer for 30 minutes, and a paste-like bonding material was obtained.

Preparation of Honeycomb Structure

An outer wall surface of the honeycomb segment was coated with a bonding material having a thickness of about 1 mm to form a bonding material layer on the surface. In this case, a portion to be coated and an amount of a coating were adjusted so as to form the bonding material layers only in portions each having a length occupying 25% of the whole length (50% in total), from each end toward the center in a central axis direction as shown in FIG. 5. Thereafter, a step of disposing another honeycomb segment on the coated surface was repeated to prepare a honeycomb segment laminated article including 16 honeycomb segments. After applying a pressure to the article from the outside, the whole article was bonded, and dried at 140° C. for two hours to obtain a bonded honeycomb segment article. Thereafter, an outer periphery of the bonded honeycomb segment article was cut into cylindrical shapes, coated with a coating material, and dried and cured at 700° C. for two hours to obtain a honeycomb structure.

Examples 2 and 3 and Comparative Example 1

Figure 7A:
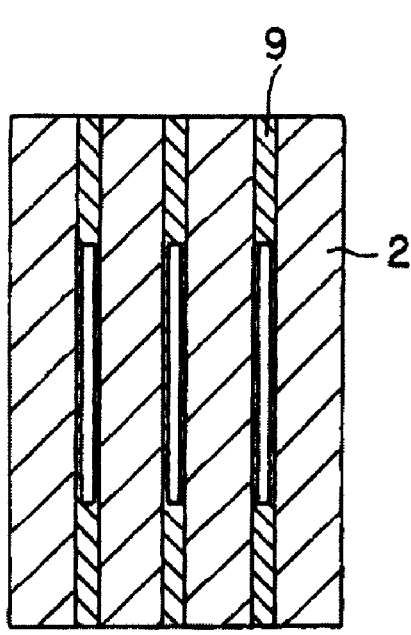
FIG. 7(a) is a sectional view schematically showing still another example in which a bonding material layer (partial bonding material layer) is disposed in a honeycomb segment in Example 3.
Figure 7B:
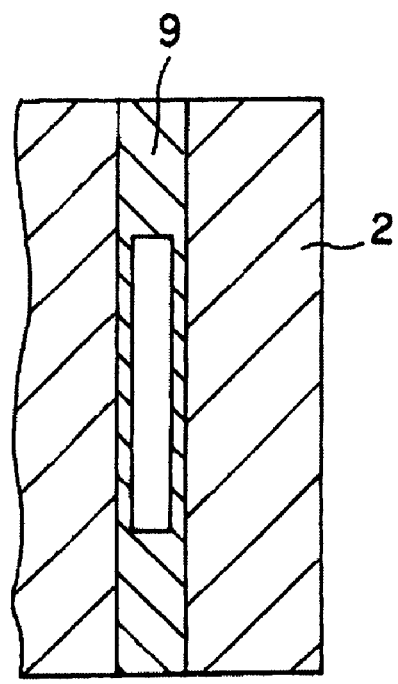
FIG. 7(b) is a partially enlarged view of FIG. 7(a)
Figure 8:
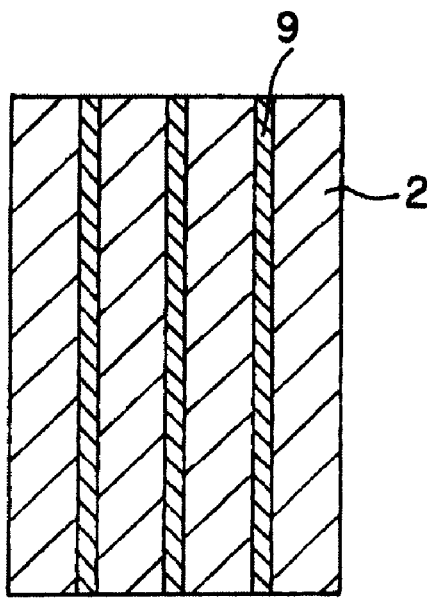
FIG. 8 is a sectional view schematically showing a further example in which a bonding material layer is disposed in a honeycomb segment in Comparative Example 1.

Example 2 was similar to Example 1 except that a length of a portion to be provided with a bonding material layer was changed to a length occupying 15% (30% in total) of the whole length, from the center toward each end in a central axis direction during coating of a bond surface with a bonding material as shown in FIG. 6. Comparative Example 1 was similar to Example 1 except that a portion to be provided with a bonding material layer was changed to a portion on the whole side surface of each segment as shown in FIG. 8. In Example 3, after coating the whole opposite bond surfaces with a bonding material, a cardboard having a thickness of 0.4 mm was sandwiched between portions each having a length occupying 25% of the whole length (50% in total), from the center toward each end in a central axis direction, and a honeycomb segment laminated article was prepared. In the subsequent thermal treatment step, the cardboard buried in the bonding material was burnt to form a hollow in the bonding material, and a honeycomb segment was obtained in which a bonding material layer was formed only in an portion having a length occupying 25% (50% in total) of the whole length, from each end toward the center in a central axis direction as shown in FIGS. 7(a) and 7(b).

Evaluation

In Examples 1 to 3 and Comparative Example 1, a rapid heating test (burner spalling test: "B-sp" test) was performed, and generation of a defect was measured by observing a cut face obtained by cutting a honeycomb bonded article. Results are shown in Table 1. It is to be noted that the rapid heating test (burner spalling test: "B-sp" test) means a test in which air heated with a burner is passed through the honeycomb structure to make a temperature difference between the center and an outer portion, and a resistance to thermal shock is evaluated with a temperature at which any crack is not generated in the honeycomb structure. Here, in Table 1, a case where any defect is not generated in the bonded article (cut face) is evaluated as O, and the generation of the defect is evaluated as X.

TABLE 1

| | Place where bonding material layer is disposed | Maximum temperature in DPF | | | |
|---|---|---|---|---|---|
| | | 600 | 700 | 800 | 900 |
| Comparative Example 1 | Whole bond surface | O | X | X | X |
| Example 1 | Length occupying 25% (50% in total) of whole length, from each end toward center in central axis direction | | O | O | X |
| Example 2 | Length occupying 15% (30% in total) of whole length, from center toward each end in central axis direction | | O | O | X |
| Example 3 | Length occupying 25% (50% in total) of whole length, from each end toward center in central axis direction | | O | O | X |

From the results of Table 1, it has been found that a temperature at which a defect is generated is high, and a performance is improved in Examples 1 to 3 in which each bonding material layer is disposed avoiding a portion supposedly having a high temperature gradient and having a maximum thermal stress generated in a central axis direction, as compared with Comparative Example 1.

According to the present invention, a honeycomb structure is useful as a trapping filter for an exhaust gas, for example, a diesel particulate filter (DPF) for trapping and removing particulate matters (particulates) included in an exhaust gas from a diesel engine or the like.

What is claimed is:

1. A honeycomb structure comprising:
   a bonded honeycomb segment article in which bond surfaces of a plurality of honeycomb segments are integrally bonded to one another via bonding material layers; and an outer peripheral coating layer which coats an outer peripheral surface of the bonded honeycomb segment article, the honeycomb structure having a structure in which a plurality of cells forming fluid channels are arranged in parallel with one another in a central axis direction,
   wherein the honeycomb segments are bonded via the bonding material layers, and
   wherein the bonding material layers occupy less than a whole bond region by occupying entire surfaces of the bond surfaces and including portions filled with bonding material and a hollow portion therein so that the bonding material layers occupy less than the whole bond region of the bond surfaces; and
   wherein each portion filled with bonding material is disposed toward an outer portion of the whole bond region of each segment, so as to cover regions within a range, from respective opposite ends toward the center in the central axis direction of the whole bond region, at each end, of a length occupying thirty percent or less of a length of the whole bond region, the filled portions total not exceeding sixty percent of the length of the whole bond region, and
   wherein a bond region is formed between respective two adjacent honeycomb segments.

2. The honeycomb structure according to claim 1, wherein the partial bonding material layer is made of an inorganic fiber, an inorganic binder, an organic binder, and inorganic particles.

3. The honeycomb structure according to claim 1, wherein the honeycomb segment is made of silicon carbide (SiC) or a silicon-silicon carbide composite material formed by use of silicon carbide (SiC) as an aggregate and silicon (Si) as a bonding material.

4. The honeycomb structure according to claim 1, wherein each portion filled with bonding material is disposed toward an outer portion of the whole bond region of each segment, so as to cover regions within a range, from respective opposite ends toward the center in the central axis direction of the whole bond region, at each end, of a length occupying fifteen percent or less of a length of the whole bond region, the filled portions total not exceeding thirty percent of the length of the whole bond region.

* * * * *